(12) United States Patent
Krause et al.

(10) Patent No.: US 7,968,153 B2
(45) Date of Patent: Jun. 28, 2011

(54) CONTINUOUS METHOD FOR PRODUCTION OF A REGIOSELECTIVE POROUS HOLLOW FIBRE MEMBRANE

(75) Inventors: Bernd Krause, Rangendingen (DE); Hermann Göhl, Bisingen-Zimmern (DE); Christoph Beck, Bitz (DE); Jürgen Dannenmaier, Balingen (DE); Michael Müller, Stuttgart (DE); Edmund Kurz, Magstadt (DE); Heinrich Malthaner, Stuttgart (DE); Christian Oehr, Herrenberg (DE); Markus Storr, Leinfelden-Echterdingen (DE)

(73) Assignees: Gambro Dialysatoren GmbH (DE); Fraunhofer-Gesellschaft zur Forderung Det Angewandten Forschung (DE)

( * ) Notice: Subject to any disclaimer, the term of this patent is extended or adjusted under 35 U.S.C. 154(b) by 940 days.

(21) Appl. No.: 11/631,786

(22) PCT Filed: Jul. 4, 2005

(86) PCT No.: PCT/SE2005/001088
§ 371 (c)(1), (2), (4) Date: Aug. 1, 2007

(87) PCT Pub. No.: WO2006/006918
PCT Pub. Date: Jan. 19, 2006

(65) Prior Publication Data
US 2007/0296105 A1 Dec. 27, 2007

Related U.S. Application Data (60) Provisional application No. 60/521,861, filed on Jul. 13, 2004.

(30) Foreign Application Priority Data

Jul. 9, 2004 (SE) .................................. 0401834

(51) Int. Cl.
*B01D 39/00* (2006.01)
*B01D 67/00* (2006.01)
*H05H 1/00* (2006.01)

(52) U.S. Cl. .............. 427/533; 210/500.42; 210/500.41; 264/48

(58) Field of Classification Search ............. 210/500.22, 210/500.41, 500.42; 264/41, 48; 427/532, 427/533
See application file for complete search history.

(56) References Cited

U.S. PATENT DOCUMENTS 3,952,568 A   4/1976   Wareing et al.
4,806,246 A   2/1989   Nomura
(Continued)

FOREIGN PATENT DOCUMENTS

EP   0 388 811 A1   9/1990
(Continued)

OTHER PUBLICATIONS

International Search Report mailed Oct. 10, 2005 for International Application No. PCT/SE2005/001088.

*Primary Examiner* — Ana M Fortuna
(74) *Attorney, Agent, or Firm* — Finnegan, Henderson, Farabow, Garrett & Dunner, LLP (57) ABSTRACT

A continuous method for production of a porous hollow fibre membrane having regioselective affinity for compounds in blood or other biologically active fluids to be removed during purification of blood or said fluids is disclosed, as well as a porous hollow fibre membrane produced by said method, an adsorption device containing such a porous hollow fibre membrane, and use of such a porous hollow fibre membrane.

14 Claims, 3 Drawing Sheets

U.S. PATENT DOCUMENTS

| | | |
|---|---|---|
| 5,314,539 A | 5/1994 | Brown et al. |
| 5,338,770 A | 8/1994 | Winters et al. |
| 5,439,736 A | 8/1995 | Nomura |
| 5,798,261 A | 8/1998 | Koontz |
| 6,022,902 A | 2/2000 | Koontz |
| 6,250,222 B1 | 6/2001 | Verlinden et al. |
| 7,591,948 B2 * | 9/2009 | Muller et al. ......... 210/645 |

FOREIGN PATENT DOCUMENTS

| | | |
|---|---|---|
| GB | 2 089 285 A | 6/1982 |
| WO | WO 91/15952 | 10/1991 |
| WO | WO 03/090910 A1 | 11/2003 |

* cited by examiner

Fig. 1

Figure 2: Pressure distribution in the individual vacuum chambers

CONTINUOUS METHOD FOR PRODUCTION OF A REGIOSELECTIVE POROUS HOLLOW FIBRE MEMBRANE

This application is a national stage application under 35 U.S.C. §371(c) of International Application No. PCT/SE2005/001088, filed internationally on Jul. 4, 2005, which claims the benefit of priority to Swedish Application No. 0401834-7, filed in Sweden on Jul. 9, 2004, and U.S. Provisional Patent Application No. 60/521,861, filed on Jul. 13, 2004, the entire disclosures of which are hereby incorporated by reference.

TECHNICAL FIELD OF THE INVENTION

The present invention relates to a continuous method for production of a porous hollow fibre membrane having regioselective affinity for compounds in blood or other biologically active fluids to be removed during purification of blood or said fluids, a porous hollow fibre membrane produced by said method, an adsorption device containing such a porous hollow fibre membrane, and use of such a porous hollow fibre membrane.

BACKGROUND ART

Porous hollow fibre membranes are examples of porous affinity membranes having a blood side and a filtrate side. Such membranes are well known for analytical, diagnostic or therapeutical purposes. For example, such porous hollow fibre membranes are useful for the treatment of blood or other biologically active fluids with a view to eliminating undesired compounds therefrom, i.e. in therapeutic apheresis. Porous hollow fibre membranes are normally composed of a bundle of separate microporous hollow fibres. For detoxification of whole blood, e.g. dialysis and plasmapheresis, the membrane bundle is normally potted at each end of a polycarbonate tube fitted with two ports in a shell. The blood is normally extracorporeally pumped through a lumen representing the blood side, of each fibre, and a part of the blood plasma penetrates, i.e. is filtrated, through the pores of the fibre wall into an outer compartment representing the filtrate side, surrounding each fibre in the bundle. The concentrated blood containing blood cells, too large to enter the pores, and the remaining non-filtered part of blood plasma passes through the lumen. In a venous blood line the filtrated blood plasma stream is normally added to the non-filtered blood stream and returned to the patient.

With a view to eliminating undesired compounds from the blood, the surfaces and pores of the porous hollow fibre membranes are provided with activated sites or ligands specific for binding to the undesired blood compounds to be eliminated. Such activated sites or ligands are normally based on or bound to functional groups, e.g. amino, carboxy, or sulfonic acid groups, on the porous membrane surface. The undesired compounds to be eliminated from the blood are normally toxins of different kinds, e.g. bacterially derived toxins. Further examples of such undesired compounds are presented below.

The lumen surfaces on the blood side of microporous hollow fibre membranes, the surfaces of the pores and the surfaces on the filtrate side of such membranes are often provided with such activated sites or ligands, particularly for purification of blood or biologically active fluids.

In blood purification applications activated sites or ligands, e.g. positive amino groups as functional groups for heparin or endotoxin adsorption, on the surface on the blood side of such membranes may activate certain blood constituents, e.g. thrombocytes. In such a case, these blood constituents are activated and/or adhered to the ligands and are significantly reduced from the blood. Such an adhesion is undesired. Other blood constituents, e.g. leucocytes, red blood cells and proteins, may to some extent also be adhered to such ligands or activated sites on the blood side of the membrane.

This undesired activation of blood constituents in such membranes has since long been a great problem, in particular the accompanying undesired elimination of thrombocytes from the blood. Several attempts have been made to solve this problem to prepare microporous hollow fibre membranes lacking the above-mentioned ligands or activated sites on the blood side of the membrane, but so far only complicated processes requiring large amounts of reaction chemicals and solvents have been found. Moreover, these processes are also expensive, ineffective and not environmentally friendly, thereby creating problems highly needed to solve.

The type of materials used in such membrane products is determined by cost and their thermomechanical properties. In many cases the corresponding physico-chemical surface compositions are not suitable for appropriate system integration, or these do not fit to the desired interaction with a contacting solid, liquid or gaseous counterpart. In these cases chemical surface modification is applied to establish a special surface functionality. The conventional techniques used are wet chemical ones, as mentioned above and, more frequently and preferably, gase phase reactions like plasma glow discharge. The latter technique is advantageous, especially in case of polymer materials, because the highly reactive plasma species, which are easily generated from low molecular weight functional precursors under glow discharge conditions, can modify the relatively inert polymer surfaces, and no strong acids or alkali, affording waste removal, are necessary. Plasma or glow discharge treatment techniques are disclosed in numerous publications, for instance in J. R. Hollahan and A. T. Bell: "*Techniques and applications of plasma chemistry*", Wiley N.Y. 1974, or H. Yasuda, J. Macromolecular Sci. Chem. A 10, 383 (1976), as well as in WO 03/090910 (Gambro Lundia AB). In principle there are two routes to modify surfaces using plasma. The first one is performed under ambient pressure, where barrier discharges may be excited. In these cases very often only oxidation is achieved. Principally the result is a more inhomogeneous surface activation, thermal effects are observed and relatively heterogeneous chemical surface compositions are predominant. The second route is performed at a low pressure in the range between 0.05 mbar and 10 mbar using high frequency excitation like 13.56 MHz, where only the electrons are accelerated towards very high temperatures, but the molecular and atomic species achieve only a very slight increase in temperature. Under such plasma conditions, a much higher quality of surface finish is obtained, thermal effects can be neglected, adsorbed contaminating layers are desorbed or can be etched and well defined layers of hydrophobic characterisitics or thin and stable surface modifications with functionally or chemically reactive groups like carboxyl-, amino-, or hydroxyl- can be generated. Respective reviews have been published in J. Phys. D, App. Phys. 34, 2761-2768 (2001) by M. J. Shelton and G. C. Stevens, by Jonathan M. Kelly, Robert D. Short, Morgan R. Aleander: "Experimental evidence of a relationship between monomer plasma residence time and carboxyl group retention in acrylic acid plasma polymer", Polymer, 44, 3173-3176 (2003), by William G. Pitt: "Fabrication of a Continuous Wettability Gradient by Radio Frequency Plasma Discharge" Journal of Colloid and Interface Science 133 (1), 223-227 (1989), C. G. Gölander, M. W. Rutland, D. L. Johansson, H.

Ringblom, S. Jönsson and K. Yasuda: "Structure and Surface Properties of Diaminocyclohexane Plasma Polymer Films", Journal of Applied Polymer Science 49. 39-41 (1993), and in Patent WO 03/090910 A1.

An atmospheric pressure plasma process can be easily integrated into any continuous production line without investment into vacuum equipment. But this advantage is basically accompanied by lower quality in the resulting surface finish. In case of the low pressure glow discharge technique, the higher surface finish quality requires extra pumping units and vacuum vessels. The material to process has to be incorporated into the vacuum equipment in advance and collected after processing in a special area of the-closed vacuum system, but a good quality of surface functionalisation without thermal effects may be achieved.

Further, the low pressure plasma processing is basically realized in a batch-like manner restricting the integration into other consecutive production steps. Proposals to overcome this limitation are the subject matter of several patents, for instance U.S. Pat. Nos. 5,314,539, 6,250,222 and GB 2,084,264 concerning plasma or vacuum treatment of flat materials like foils or photographic films, and U.S. Pat. No. 3,952,568 for the vacuum processing of rod, wire or strip materials. The basis of all these constructions is a sequential reduction of pressure using a series of drive rollers contacting the substrate surface (flat material), or dies with an opening not more than 0.2 mm larger than the diameter of the respective rod or wire (circular material) and a surface finish of the rollers or dies to minimize friction, separated by pumping chambers.

None of these patents excludes porous materials as substrates which, due to their low mechanical strength, high void volume and inner surface area, may lead to the problem of an intense transport of air into the vacuum system. These types of material are widely used in separation technology and medical analytic systems or as catalysts. In addition to their defined pore size in many applications, their wettability has to be improved, a special chemistry of the inner pore surface is necessary or a very thin film with tailored permeability characteristics towards gases or solvents has to be added. The chemical modification of these types of substrates, especially of the inner porous structure using low pressure plasma, is a topic of the U.S. Pat. Nos. 5,798,261 and 6,022,902. Plasma polymerisation onto porous membrane structures for the development of gas separation, vapour removal and fluid separation has been widely investigated, see ref. M. Yamamoto, J. Sakata, M. Hirai: "Plasma polymerized membranes and gas permeability", J. Appl. Polym. Sci, 29, 2981-2987 (1984) or T. Hirotsu, S. Nakayima: "*Water-ethanol permseparation by pervaporation through plasma graft copolymeric membranes of acrylic acid and acrylamide*", J. Appl. Polym. Sci. 36, 177-189 (1988).

Thus, air to air plasma surface modification at low pressure of wires, tubes, rods, fibers is known within the state of the art. If the outer surface of a tube or hollow fibre is to be modified, then the gas in the fibre lumen may not interfere with the plasma, which is circumferential around the tube or hollow fibre. Especially, when the lumen is smaller than about 1 mm, there will be no plasma ignition in the lumen because at the low pressure mode the mean free path length of the gas molecules is too long. In the case of a hollow fibre structure with a large pore size and a high porosity, you need just to exhaust the air flow entering the entrance hole of the hollow fibre into the vacuum. The diffusion of gas out of the lumen will not significantly be restricted by a flow resistance of the porous structure. The problem arises when there is a significant flow resistance of the porous structure to exhaust the air out of the lumen. As long as there is a pressure gradient from the lumen to the outside of the hollow fibre, a flow of gas through the structure will take place, and a lumen pressure gradient from the entrance point of the hollow fibre into the vacuum system will be observed. Additionally, this distance gradient of the local lumen pressure cannot be determined in a straightforward manner. In case of plasma modification of the outer surface and the inner porous structure, an opposite flow of gas, not from the inside to the outside of the porous structure, but a flow and diffusion of activated gas from the outside towards the lumen side is necessary.

SUMMARY OF THE INVENTION

The object of the present invention is to solve the above problems with low pressure plasma ignition procedures for production of porous hollow fibre membranes having regioselective affinity for undesired compounds in blood or other biologically active fluids with a view to avoiding undesired activation of constituents in blood or other biologically active fluids in microporous affinity membranes during the purification treatment of blood or said fluids.

This object is achieved with a method for continuous production of a porous hollow fibre membrane having regioselective affinity for compounds in blood or other biologically active fluids to be removed during purification of blood or said fluids, wherein a porous hollow fibre membrane substrate 1 having a blood side and a filtrate side connected via pores is fed through a vacuum system comprising a first vacuum sealed chamber 5 having a pressure of at most 300 mbar, a vacuum sealed plasma ignition chamber 10 having a pressure of at most 0.05 mbar, and a last vacuum sealed chamber 28 having a pressure of at most 300 mbar, and any further vacuum sealed chambers located between any of said chambers 5, 10, and 28, all chambers being consecutively interconnected in series, wherein when said porous hollow fibre membrane substrate 1 reaches the vacuum sealed plasma ignition chamber 10, in which a precursor gas containing functional groups has been introduced and has displaced any residual air present therein, the porous hollow fibre membrane substrate 1 is subjected to a plasma ignition, wherein said functional groups in the precursor gas are regioselectively and homogeneously bound to the filtrate side surface and pore surface of the porous hollow fibre membrane substrate 1.

The present invention also relates to a porous hollow fibre membrane produced by said process, an adsorption device containing such a porous hollow fibre membrane, and use of such a porous hollow fibre membrane.

More precisely, the porous hollow fibre membrane substrate 1 is passed through a set of consecutive pressure chambers with a view to setting the ambient pressure from atmospheric pressure to a vacuum in the µbar range in line and after the plasma ignition in a corresponding way increasing the ambient pressure back to an atmospheric pressure.

In one embodiment of the method according to the present invention the vacuum system contains more than three vacuum sealed chambers 5, 7, 9, 10, 24, 26, and 28 consecutively interconnected in series, and wherein the pressure before functionalisation of the porous hollow fibre membrane substrate 1 decreases gradually from the first vacuum sealed chamber 5 through the subsequent vacuum sealed chambers 7, 9 to a minimum pressure in the vacuum sealed plasma ignition chamber 10, and then gradually increases in the subsequent vacuum sealed chamber 24, 26 to the last vacuum sealed chamber 28.

In one embodiment of said method the vacuum system contains 7 cylindrical vacuum sealed chambers 5, 7, 9, 10, 24,

26, and 28 consecutively interconnected in series, wherein the vacuum sealed plasma ignition chamber 10 is centrally located in said series.

In said method the functional groups comprised in the precursor gas may be amino, carboxyl, aldehyde, ester, epoxy, hydroxyl or sulphonic acid groups.

In said method the precursor gas may be diamino-cyclohexane (DACH), diethylenetriamine (DETA) or ammonia.

In said method ligands having affinity for the compounds in blood or other biologically active fluids may be bound to the functional groups.

In said method the ligands may be proteins, peptides, amino acids, carboxylic acids, nucleotides, oligonucleotides, antigens or antibodies, and mixtures of two or more thereof.

In said method the porous hollow fibre membrane substrate 1 may have an inner diameter of 70-700 μm, preferably 200-400 μm; a wall thickness of 20-150 μm, preferably 50-100 μm; an outer diameter of 110-1000 μm, preferably 300-800 μm, most preferably 420 μm; a pore diameter of 0.05-5.0 μm, preferably 0.2 μm, a porosity of 50-90%, preferably 65%; and a tortuosity of 1-3, preferably 1.5.

In said method the pressure in the first vacuum sealed chamber 5 may be 5-300 mbar, preferably 10-25 mbar, and most preferably 15 mbar, the pressure in the vacuum sealed chamber 28 may be 5-300 mbar, preferably 10-25 mbar, and most preferably 15 mbar; and the pressure in the last vacuum sealed plasma ignition chamber 10 may be 0.0001-0.05 mbar, preferably 0.005-0.01 mbar, and most preferably less than 0.007 mbar, before the introduction of the precursor gas.

In said method the pressure in the vacuum sealed plasma ignition chamber (10) after the introduction of the precursor gas may be 0.05-10 mbar, preferably 0.25 mbar.

In said method the length of the vacuum sealed chambers 5 and 28 may be 20-80 mm, preferably 40-60 mm, the length of the vacuum sealed chambers 7 and 26 may be 100-450 mm, preferably 235 mm; the length of the vacuum sealed chambers 9 and 24 may be 100-1200 mm, preferably 320 mm; and the length of the vacuum sealed plasma ignition chamber 10 may be 10-1000 mm, preferably 200-800 mm, and most preferably 660 mm.

In said method nitrogen may be added to a nitrogen addition chamber 3 preceding the first vacuum sealed chamber 5 and to a nitrogen addition chamber 30 following the last vacuum sealed chamber 28.

In said method each vacuum sealed chamber may be separated from each other by an annular feed trough having an inner diameter of 0.05-0.8 mm, preferably 0.2 mm more than the outer diameter of the porous hollow fibre membrane substrate 1, said inner diameter being 0.2-1.0 mm.

In said method the vacuum sealed chambers 5, 7, 9, 10, 24, 26, and 28 may be separated by feed troughs 6, 8, 19, 22, 25, 27, and 29, respectively, and wherein the nitrogen addition chamber 3 may be connected to the first vacuum sealed chamber 5 via a feed trough 4, and the last vacuum sealed chamber 28 may be connected to the nitrogen addition chamber 30 via a feed trough 29.

In said method the porous hollow fibre membrane 1 after the plasma ignition step is fed through the vacuum sealed chambers 24, 26, and 28 and is emitted from the vacuum system, and wherein said method is continued as long as the porous hollow fibre substrate is fed into the vacuum system.

In said method the velocity of the porous hollow fibre membrane substrate 1 through the vacuum sealed plasma ignition chamber 10 may be 0.5-100 m/min, preferably 10 m/min.

In said method the residence time of the porous hollow fibre membrane substrate 1 in the vacuum sealed chambers 5 and 28 may be 0.05-1 s, preferably 0.3 s, in the vacuum sealed chambers 7 and 26 1-5 s, preferably 1.5 s; in the vacuum sealed chambers 9 and 24 1-10 s, preferably 2 s, and in the plasma vacuum chamber 10 0.5-30 s, preferably 4 s.

In one embodiment of said method the residence time in the nitrogen addition chambers 4 and 30 may be 0.05-1 s, preferably 0.3 s.

In one embodiment of said method the ignition frequency during the plasma ignition may be 1 kHz-13.56 MHz or multiples of 13.56 MHz or microwave frequency, the power may be 0.5-50 W, preferably 20 W, and the voltage of the electrodes may be 50-500 V, preferably 250 V.

In said method the porous hollow fibre membrane substrate 1 may be made up of a mixture of polyarylether-sulfone and polyvinylpyrrolidone and may be assembled in modules containing a bundle of 10 up to more than 10 000 fibres.

In said method the vacuum sealed chambers are evacuated by use of pumps and a porous hollow fibre membrane 1 is introduced into the vacuum system.

In said method the vacuum sealed plasma ignition chamber 10 may be evacuated with a liquid nitrogen trap 17 and a pump 18.

In said method a carrier gas, preferably helium, nitrogen, hydrogen, and argon, or mixtures thereof, may be mixed with the precursor gas before or in connection with the addition thereof into the plasma ignition chamber 10.

In one embodiment of the porous hollow fibre membrane according to the present invention produced and having functional groups homogeneously bound and having regioselective affinity for compounds in blood or other biologically active fluids to be removed during purification of blood or said fluids, said membrane may be provided with functional groups bound only to the pore surface and the surfaces on the filtrate side of the porous hollow fibre membrane.

Said porous hollow fibre membrane may be provided with regioselectively bound amino groups in a density of 0.5-10 μmol/g membrane, preferably 1.7 μmol/g membrane.

Said porous hollow fibre membrane may also be provided with ligands having specificity for the components in blood or other biologically active fluids to be removed or bound to the functional groups, said ligands preferably being proteins, peptides, amino acids, carboxylic acids, nucleotides, oligonucleotides, antigens, or antibodies, and mixtures of two or more thereof.

In one embodiment of the adsorption device according to the present invention it contains said porous hollow fibre membrane.

In one embodiment of the use of the porous hollow fibre membrane it may be intended for therapeutic apheresis, diagnostic applications, or drug development applications.

The present invention also relates to an apparatus used in the method according to the present invention, wherein it comprises a vacuum system containing a first vacuum sealed chamber 5, a vacuum sealed plasma ignition chamber 10, and a last vacuum sealed chamber 28, and any further vacuum sealed chambers located between any of said chambers 5, 10, and 28, all chambers being consecutively interconnected in series, preferably by feed troughs.

In one embodiment of said apparatus the vacuum system may contain 7 cylindrical vacuum sealed chambers 5, 7, 9, 10, 24, 26, and 28 consecutively interconnected in series, wherein the vacuum sealed plasma ignition chamber 10 may be centrally located in said series.

Other objects, features, advantages and preferred embodiments of the present invention will become more apparent from the following detailed description when taken in conjunction with the drawings and the appended claims.

DETAILED DESCRIPTION OF DIFFERENT EMBODIMENTS

Throughout the application text and the claims the following abbreviations are used:
PES=polyethersulfone
PVP=polyvinylpyrrolidone
PP=polypropylene
DACH=diaminocyclohexane
DETA=diethylenetriamine
DMPA=dimethylaminopropylacrylamide
ESCA=electrospectroscopy for chemical analysis
PFBA=pentafluorobenzaldehyde
sccm=standard cubic centimetre per minute The term "precursor gas containing functional groups" used throughout the application text means the gaseous form of the molecule leading to surface modification during gas plasma treatment. In the gas plasma, these molecules comprising the functional groups are converted to activated species, i.e. radicals or ions. During the gas plasma treatment, there is a retention of functional groups of the precursor gas resulting in a functional membrane surface, i.e. a membrane with regioselective affinity, having the ability to covalently bind different ligands in some defined areas of its surface structure.

The term "blood" used throughout the application text is intended to cover whole blood and different modifications thereof in which one or more of the constituents thereof have been separated off.

The term "other biologically active fluids" used throughout the application text means pharmaceutically useful solutions or pharmaceutical preparations which contain a biologically active component, such as a coagulation factor.

The term "blood side" used throughout the application text means the membrane side on which blood or another biologically active fluid is brought to flow during purification by use of a microporous affinity membrane, i.e. the inner (lumen) side of the porous hollow fibre membrane.

The term "filtrate side" used throughout the application text means the membrane side which the filtered part of blood or another biologically active fluid reaches after having passed through the pores of the porous hollow fibre membrane, i.e. the outer (shell) side of the porous hollow fibre membrane.

The term "compound in blood . . . " used throughout the application text means an undesired compound intended to be removed from the blood.

The terms "blood constituent" and "constituents in blood" used throughout the application mean components normally existing in blood, e.g. different blood cells and proteins.

The term "gas mixture" used throughout the application text means the mixture between the precursor gas and any carrier gas transferring energy, but is also used, for simplicity reasons, for the embodiment when a carrier gas is absent.

The term "gas plasma mixture" used throughout the application means the medium resulting from the plasma ignition of the precursor gas and containing the activated species providing the binding of functional groups to the surfaces in question.

The terms "porous hollow fibre membrane substrate" and "membrane substrate" used throughout the application text means an untreated, not functionalised porous hollow fibre membrane, i.e. lacking regioselective affinity and intended as a start material in the process according to the present invention.

The term "porous hollow fibre membrane" used throughout the application text is intended to cover everything from one functionalised porous single hollow fibre up to several single hollow fibres and one or more bundles of such microporous hollow fibres, each fibre having a filtrate side and a blood side.

The terms "homogeneous" and "homogeneously" used herein in connection with the surface functionalisation mean that the functional groups are bound with a certain axial symmetric density on the membrane surface.

The term "vacuum sealed chamber" used throughout the application text means a chamber volume, which is tightly separated from atmospheric air and connected to a vacuum pump providing a pressure significantly below atmospheric pressure.

In one embodiment of the present invention, porous hollow fibre membranes are regioselectively modified or functionalised only on the outer surface, i.e. the filtrate side, and on the surfaces within the pores in a more homogeneous way compared to known techniques. The membrane lumen surface, i.e. on the blood side, which comes into contact with whole blood when the membranes are used for blood treatment in therapeutic apheresis, is to remain unmodified. This is achieved by avoiding affinity on the blood side, thereby inhibiting the interaction between certain blood constituents and the ligands bound to functional groups introduced regioselectively during the membrane modification process. This is an important requirement for selective removal of compounds from whole blood or other biologically active fluids within a membrane adsorption device.

A major advantage of the present invention compared to prior art is that porous hollow fibre membrane substrates may be functionalised in a more homogeneous way on the desired surface areas of the membrane. Further, said functionalisation may take place in a continuous way implying a more economic process, consuming a smaller amount of precursor gas, compared to discontinuous processes.

The functional groups to be introduced on the membrane substrate surfaces of interest are preferably amino groups originating from such molecules as amino compounds (diamines, triamines), e.g. diaminocyclohexane (DACH) and diethylenetriamine (DETA), but also from all organic precursors with primary amino groups or mixtures of hydrogen with nitrogen or ammonia, provided their vapour pressure is high enough to give a substantial amount of the molecule containing the functional groups in the vapour phase. Further, other functional groups than amino groups can be introduced, e.g. carboxyl, hydroxyl, sulphonic acid, ester or epoxy groups, when precursors comprising corresponding functions are used instead of compounds containing amino functions.

Optionally, a stabilising carrier gas, which is chemically inert during the gas plasma reaction, may be mixed with the precursor gas before or in connection with the addition thereof into the plasma ignition chamber 10. Examples of the carrier gas are helium, nitrogen, hydrogen, and argon, or mixtures thereof.

The microporous hollow fibre membranes produced according to the present invention are made of a biocompatible polymeric material, e.g. polyethersulfone (PES), polyvinylpyrrolidone (PVP), polypropylene (PP), polysulfone (PSU), polymethylmethacrylate (PMMA), polycarbonate (PC), polyacrylonitrile (PAN), polyamide (PA), polytetrafluorethylene (PTFE), cellulose acetate (CA), cellulose nitrate or regenerated cellulose. The length of the porous hollow membrane substrate 1 is not restricted upwards and it may be continuously fed into the vacuum system in the apparatus according to the present invention directly from its production line. In the examples below, the length of the membrane substrate is 1000 m, but it may be smaller or greater.

The inner diameter of the hollow fibres is normally 70-700 µm, e.g. 200-400 µm; the wall thickness is normally 20-150 µm, e.g. 50-100 µm; the pore diameter is 0.05-5.0 µm, e.g. 0.2 µm, the outer diameter is 110-1000 µm, e.g. 300-800 µm, such as 420 µm; the porosity is 50-90%, e.g. 65%; and the tortuosity is 1-3; e.g. 1.5. After functionalisation the fibres are normally arranged in modules e.g. containing a bundle of 10 up to more than 10 000 fibres. Experimental modules contain 10-100 fibres. Final modules for blood treatment contain more than 1000 fibres.

According to the present invention the hollow fibres used for the microporous hollow fibre membrane in one embodiment are made of a mixture of polyethersulfone and polyvinylpyrrolidone with an inner diameter of 320 µm, a wall thickness of 50 µm and a pore diameter of 0.2 µm.

As stated above, the regioselective introduction of e.g. amino groups as functional groups only on the filtrate side and on the pore surfaces, in practice gradually less towards the blood side, but not at all on the blood side of the porous hollow fibre membrane substrate, is achieved by gas plasma treatment of the membrane substrate, e.g. using DACH, DETA, or ammonia as the precursor gas containing functional groups. The use of low gas plasma power is beneficial with respect to the preservation of the functional groups. During the gas plasma treatment the precursor gas includes the activated species described above and provides the regioselective introduction of the amino groups on the surfaces of interest, however, not on the blood side of the porous hollow fibre membrane substrate, due to deactivation of activated species on the way from the plasma glow discharge zone in the plasma vacuum chamber, to the blood side.

Important parameters are the direction of the gas plasma mixture flow in relation to the membrane substrate to be treated, the mean free path length of the activated species, the flow rate of the gas plasma mixture, and the density of reactive functional species.

The ligands to be bound to the functional groups introduced on the surface of the membrane substrate filtrate side and on pore surfaces are chosen according to the type of compounds to be removed from the blood or any other biologically active fluid. Examples of ligands are proteins, peptides, amino acids, carboxylic acids, nucleotides, oligonucleotides, antigens or antibodies, and mixtures of two or more thereof, or any other convenient biomolecules. The ligands are added to the functional groups in a separate wet-chemical process, known per se.

Some basic principles behind the plasma ignition (plasma glow discharge) processes used in connection with the present invention will now be discussed.

Plasma can be ignited when the dimension of the gas containment is much higher than the mean free path length at a given gas pressure. The mean free path length is inversely proportional to the gas pressure and ranges at low pressure from 60 µm to about 400 µm. Additionally, the mean free path length is dependent on the gas type or composition.

With the pore diameter and the membrane wall thickness of the membrane structure to be treated according to the present invention, high frequency plasma ignition will normally take place only on the outer side of the membrane. When there is a pressure gradient between the outer side of the membrane and the lumen side, the diffusion of activated particles entering the pore structure is enhanced by an extra flow of active species from the plasma zone outside of the membrane substrate. The activated particles will collide with gas molecules and with the walls of the pores on their way from the plasma zone into the pore structure and dissipate their energy. The amount of gas molecules or wall contacts which is necessary for losing the activating energy can be defined by the plasma parameters used. In consequence, there will be a decreasing chemical modification density of the pore walls from the plasma zone area into the membrane structure. The chemical plasma modification density distribution can be influenced by the pore geometry, the plasma intensity, the pressure inside and outside of the membrane, the gas composition and the power spectrum of electric frequency input.

Figure 1:
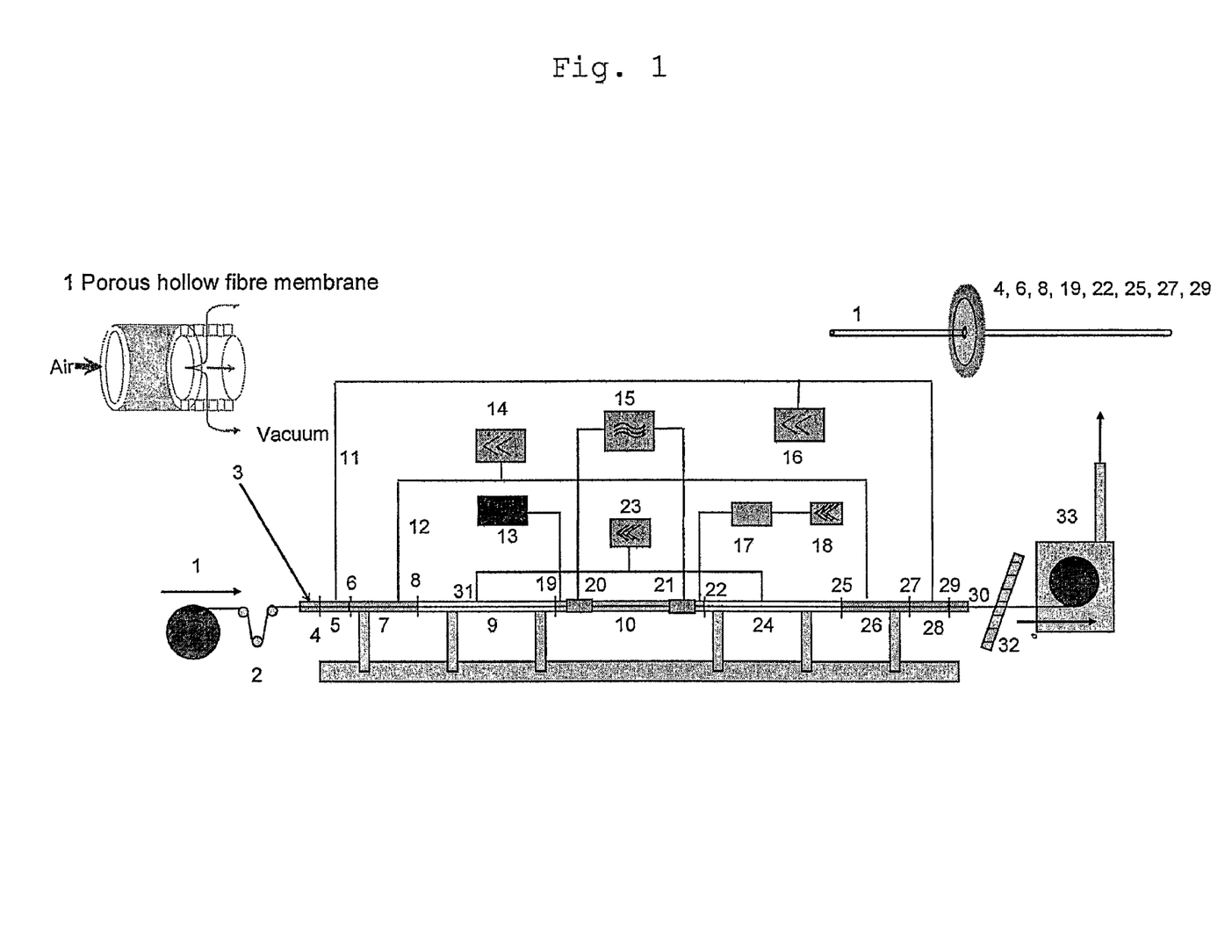
FIG. 1 shows a scheme of the apparatus used for plasma ignition of the porous hollow fibre membrane substrate 1 in one embodiment of a method according to the present invention.
Figure 2:
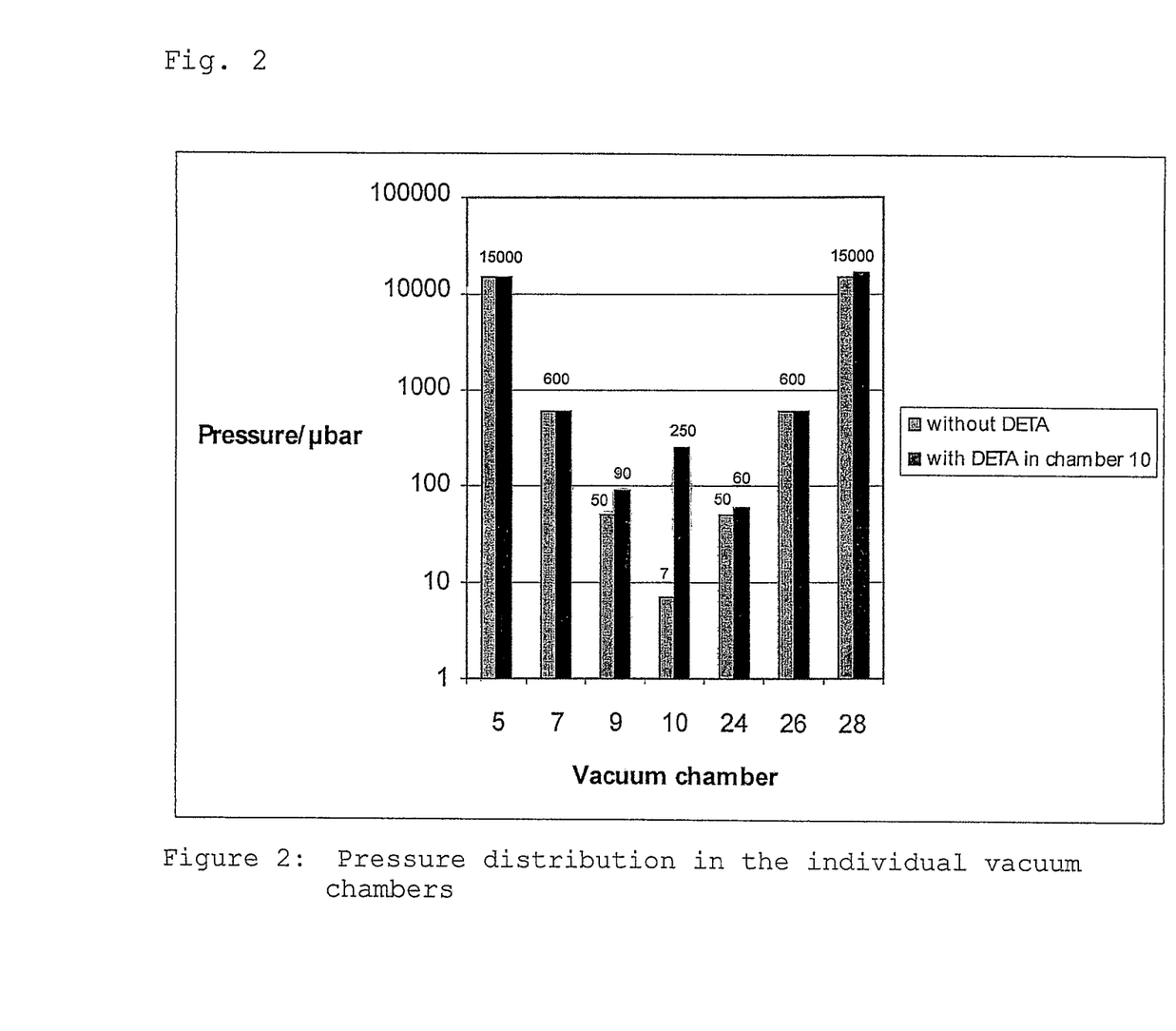
FIG. 2 shows the pressure profile in the individual vacuum chambers used in connection with one embodiment of the method according to the present invention.

One embodiment of the present invention will now be disclosed in detail in connection with FIGS. 1 and 2.

With reference to FIG. 1 a certain length of a porous hollow fibre membrane substrate 1 is initially fed into an apparatus comprising a vacuum system. Said vacuum system comprises a series of vacuum sealed chambers separated from each other by feed troughs. Said vacuum sealed chambers are connected to pumps in such a way that the pressure before functionalisation of the porous hollow fibre membrane 1 decreases gradually from a first vacuum sealed chamber 5 at the entrance of the vacuum system, i.e. the fibre inlet chamber, through the subsequent vacuum sealed chambers to a minimum pressure in a vacuum sealed plasma ignition chamber 10, constituting one of said vacuum sealed chambers, in which the plasma ignition is to take place. The pressure is then gradually increasing in the subsequent vacuum sealed chambers to the last vacuum sealed chamber 28 in the outlet end of the vacuum system. The amount of vacuum sealed chambers in the series is not critical as long as the pressure profile desired is maintained, but at least three vacuum sealed chambers are required. In one embodiment, as shown in FIG. 1, the vacuum system contains seven vacuum sealed chambers 5, 7, 9, 10, 24, 26, and 28, wherein the vacuum sealed plasma ignition chamber 10 is centrally located in the line of chambers interconnected in series. In this embodiment the other vacuum sealed chambers are symmetrically arranged on both sides of the vacuum sealed plasma ignition chamber 10.

Said membrane substrate 1 is fed via a dancer roll 2 into a nitrogen inlet chamber 3 into which nitrogen is introduced with a view to displacing air introduced together with said membrane substrate 1. The membrane substrate 1 then passes through a first feed trough 4 having an inner diameter of 0.05-0.8 mm, e.g. 0.2 mm, more than the outer diameter of the porous hollow fibre membrane substrate 1. Thus, said inner diameter is 0.2-1.0 mm. In this embodiment the inner diameter of the feed troughs 4 and 29 is 0.5 mm. In this embodiment the inner diameter is for the subsequent feed troughs 6, 8, 19, 22, 25, and 27 in the vacuum system is 0.6 mm.

The membrane substrate 1 then passes through the vacuum sealed chamber 5, the feed trough 6, the vacuum sealed chamber 7, the feed trough 8, the vacuum sealed chamber 9 and the feed trough 19 until it reaches the vacuum sealed plasma ignition chamber 10.

The length of the vacuum sealed chamber 5 is 20-80 mm, e.g. 40-60 mm, such as about 55 mm, and it is connected via a conduit 11 to a pump 16, e.g. a rotary vane pump, creating a pressure in the vacuum sealed chamber 5 of 5-300 mbar, e.g. 10-25 mbar, such as about 15 mbar.

The length of the vacuum sealed chamber 7 is 100-450 mm, e.g. 235 mm, and it is connected via a conduit 12 to a pump 14 providing a pressure therein of 0.5-2.0 mbar, e.g. 600 µbar.

The length of the vacuum sealed chamber 9 is 100-1200 mm, e.g. 320 mm, and it is connected via a conduit 31 to a pump 23 providing a pressure of 0.01-0.3 mbar, e.g. 50 µbar.

The above mentioned parameters for the vacuum sealed chamber 5 also apply to the vacuum sealed chamber 28.

The above mentioned parameters for the vacuum sealed chamber 7 also apply to the vacuum sealed chamber 26.

The above mentioned parameters for the vacuum sealed chamber 9 also apply to the vacuum sealed chamber 24.

The length of the vacuum sealed plasma ignition chamber 10, included in the series of vacuum sealed chambers, is 10-1000 mm, e.g. 200-800 mm, such as 660 mm. It is connected to a pump 18 via a liquid nitrogen trap 17 providing a pressure of 0.0001-0.05 mbar, e.g. 0.005-0.01 mbar, such as less than 0.007 mbar, before the introduction of the precursor gas and the plasma ignition step. The vacuum sealed plasma ignition chamber 10 also comprises two electrodes 20 and 21 connected to an RF generator in combination with a matching unit 15. The electrodes (each having a length of 3 cm and a diameter of 2.5 cm) are metal foils circumventing a quartz tube representing the vacuum sealed plasma ignition chamber 10. When the membrane substrate 1 has reached the vacuum sealed plasma ignition chamber 10, the precursor gas defined above having a pressure of 0.05-10 mbar, e.g. 0.25 mbar, is introduced therein, wherein the same pressure is established in the chamber 10. During the plasma ignition the gas plasma mixture created is fed into the chamber 10 by a suitable evaporation of an organic compound containing the functional group, e.g. an amine containing carbohydrate fluid, such as diethylenetriamine(DETA), diaminocyclohexane (DACH), or ammonia. Before the precursor gas has entered the vacuum sealed plasma ignition chamber 10, any residual air present in this chamber is displaced or evacuated, i.e. less than 1% of the plasma forming gas composition is residual gas from the ambient atmosphere which had leaked into said chamber from the adjacent vacuum sealed chambers 9 and 24. The pressure in the vacuum sealed chamber 9 then increases to 55-150 µbar, e.g. 90 µbar, and in the vacuum sealed chamber 24 to 55-150 µbar, e.g. 60 µbar. In that way the plasma vacuum chamber 10 is substantially freed from air, which is advantageous for the chemical reactions during the plasma ignition step. The ignition frequency during the plasma ignition is 1 kHz-13.56 MHz or multiples of 13.56 MHz or microwave frequency. The power is 0.5-50 W, e.g. 20 W, and the voltage of the electrodes is 50-500 V, e.g. 250 V.

The velocity of the porous hollow fibre membrane substrate 1 through the vacuum sealed plasma ignition chamber 10 is 0.5-100 m/min, e.g. 10 m/min. The precursor flow rate is 0.1-10 sccm, e.g. 2 sccm.

The residence time of the porous hollow fibre membrane substrate in the vacuum sealed chambers 5 and 28 is 0.05-1 s, e.g. 0.3 s, in the vacuum sealed chambers 7 and 26 1-5 s, e.g. 1.5 s; in the vacuum sealed chambers 9 and 24 1-10 s, e.g. 2 s, and in the vacuum sealed plasma ignition chamber 10 0.5-30 s, e.g. 4 s.

During the plasma ignition step the outer surfaces and the pore surfaces of the porous hollow fibre membrane substrate 1 are functionalised in a homogeneous way with the functional groups, e.g. amino groups. Said surfaces are homogeneously bound with amino groups of a density of 0.5-10 µmol/g membrane, e.g. 1.7 µmol/g membrane.

After the plasma ignition step the porous hollow fibre membrane produced is fed through the feed trough 22, the vacuum sealed chamber 24 (connected to the pump 23), the feed trough 25, the vacuum sealed chamber 26 (connected to the pump 14), the feed trough 27, the vacuum sealed chamber 28 (connected to the pump 16) and the feed trough 29 to a nitrogen inlet chamber 30, to which nitrogen is added with a view to excluding the air from the feed trough 29. The porous hollow fibre membrane produced is then fed via a fibre leading device 32 to a fibre uptake assembly 33. In this way the plasma ignition process can be maintained infinitely, and in principle as long as the porous hollow fibre substrate material is available at the entrance of the system. The total period for a membrane substrate to pass the vacuum system is 2-20 s, e.g. 8 s.

Thereafter, the porous hollow fibre membrane having a regioselectively and homogeneously functionalised outer surface and pore surface may be subjected to a ligand binding step, in which the above defined ligands are bound to the functional groups.

It has also been found that at a distance of 600 mm between the feed troughs 6 and 19 an optimal lumen pressure of less than 7 µbar in the plasma ignition chamber 10 is obtained, i.e. a pressure gradient from the hollow fibre outside to the inside at a plasma pressure of 0.25 mbar will take place.

The pressure distribution in the multichamber vacuum system for the functionalisation of a porous hollow fibre membrane substrate 1 having an inner (lumen) diameter of 280 µm, an outer (shell) diameter of 340 µm, a pore size of 0.2 µm, a porosity of about 65%, and a tortuosity of about 1.5 is shown in FIG. 2. The pressure in each vacuum chamber expressed in µbar is shown in columns, in which the left column for each chamber shows the pressure before the precursor gas, i.e. DETA, is added to the vacuum sealed plasma ignition chamber 10, and the right column for each chamber shows the pressure after the introduction of precursor gas in said chamber 10. As appears from FIG. 2 the pressure in said chamber 10 is substantially increased and a slight pressure increase may also be observed in the adjacent vacuum sealed chambers 9 and 24. No other chamber pressures are influenced by said introduction of precursor gas.

In the following the present invention will be described in connection with two Examples.

EXAMPLE 1

1000 m of a porous polyarylethersulfone-polyvinyl-pyrrolidone (PAES/PVP) hollow fibre membrane substrate 1 with an outer shell diameter of 333 µm and a wall thickness of 38 µm were fed through the vacuum sealed plasma ignition chamber 10 (length: 67 cm, diameter: 2.5 cm) with a velocity of 23.5 m/min. Into said chamber 10 a precursor gas consisting of diethylenetriamine (DETA) with a pressure of 0.25 mbar was introduced with a view to depositing an amine containing carbohydrate thin film on the porous surface of the membrane. The plasma was excited with a 13.56 MHz pulsed RF power of 35 W (1 ms on, 5 ms off time). After this plasma treatment the density of amino groups was measured using the Sulfo-SDTB test (Pierce Inc. prod. No. 28610). A value of 1.7 µmol/g membrane was found. Additionally, the surface bound amino groups were derivatised with ligands using 5% pentafluorobenzaldehyde (PFBA) in cyclohexane with a contact time of 2 hrs and Soxhlet extraction with cyclohexane over night. The element distribution on the shell and in the lumen side was compared using electron spectroscopy (ESCA). It was found that there was a gradient of plasma modification from the shell side to the lumen side (see Table 1 below). The results indicate that there was no plasma formed inside the lumen of the membrane, due to the limited distance of the walls in comparison to the comparable mean free path length of the molecules at this pressure. A trace amount of fluorine on the lumen side registered by ESCA may be due to the open porous structure of the surface with originating fluorine from the inner porous structure. It is found additionally that there is no change of the Zeta potential of the lumen between functionalised and unmodified membranes.

TABLE 1

ESCA investigation of the element distribution [%] after plasma treatment and wet chemical derivatization with pentafluorobenzaldehyde

| Surface D039 | C | O | S | N | F |
|---|---|---|---|---|---|
| shell | 70.4 | 17.7 | 0.6 | 5.1 | 6.2 |
| lumen | 74.3 | 18.8 | 2.5 | 2.7 | 1.7 |

EXAMPLE 2

Figure 3:
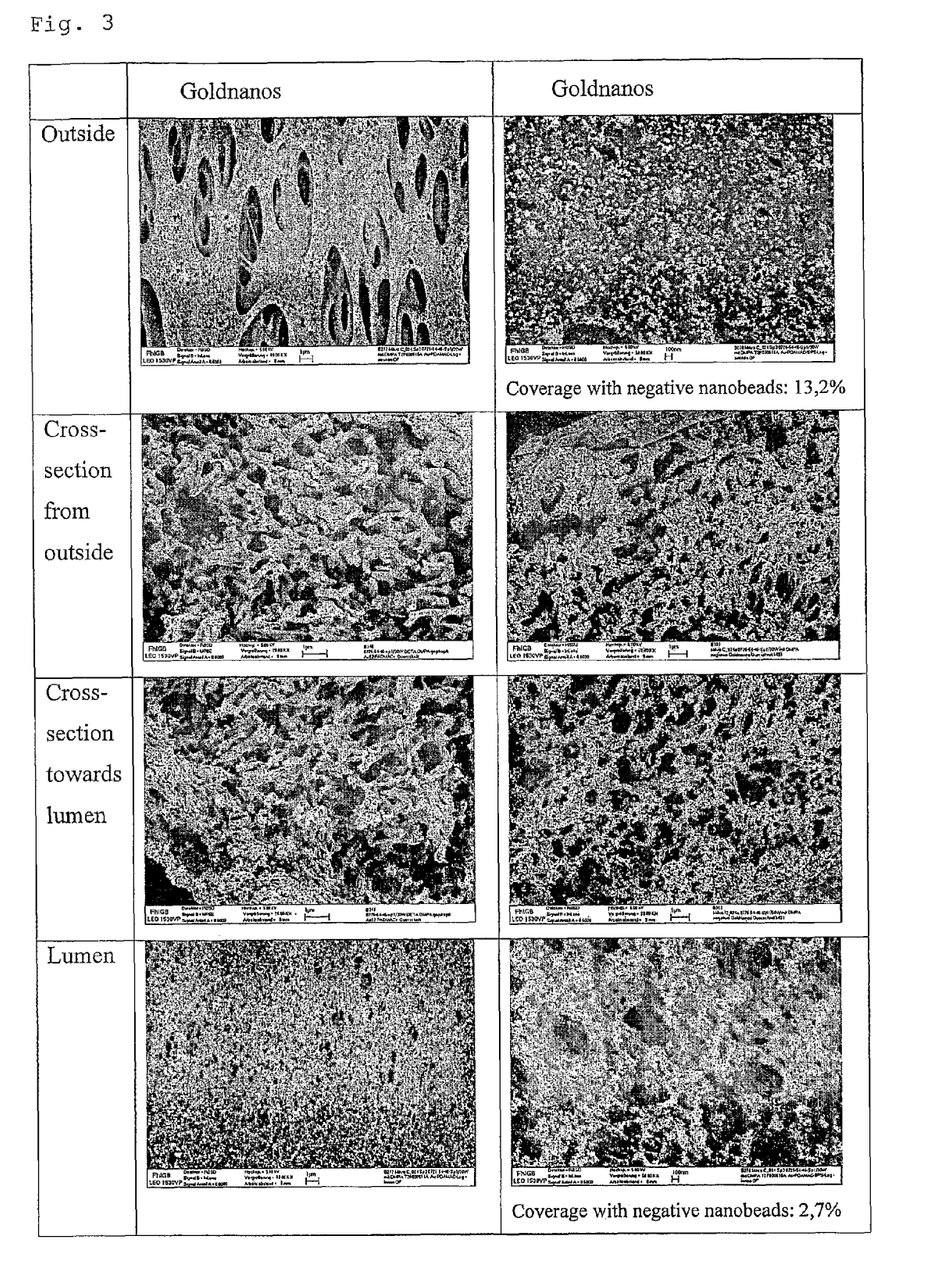
FIG. 3 shows SEM images of DETA plasma modified hollow fibre membrane samples (CO24a) grafted with DMPA after contact with positively or negatively charged gold nanobeads.

Another sample of a PAES/PVP hollow fibre membrane substrate 1 with a shell diameter of 325 μm and a wall thickness of 39 μm was fed through the vacuum sealed plasma ignition chamber 10. As precursor gas again DETA with a pressure of 0.25 mbar was fed into said chamber 10. The hollow fibre transfer velocity was 6.3 m/min and a pulsed RF power 10 W (1 ms on, 5 ms off time) was used. The Sulfo-SDTB test indicated an amino group density of 1.7 μmol/g membrane. After the amino functionalisation the fibers were modified by graft polymerisation with dimethylaminopropylacrylamide according to EP03020986.0. For further SEM investigations samples of the modified hollow fibre membranes were cut in contact with frozen deionised water or under liquid nitrogen into half pipes and cross sections. These samples were brought into contact over night with positively or negatively charged 20 nm gold nanobeads. The charging is realized using the layer by layer technique of polyelectrolyte adsorption like adsorption of polysodiumstyrenesulfonate and diallyldimethylammoniumhydrochloride. The adsorption distribution of the oppositely charged particles is seen using field emission electron spectroscopy. An overview of the results is presented in FIG. 3. The positively charged goldnanos did only slightly adsorb on the different surface parts of the membrane, whereas the adsorption of the negatively charged goldnanos is strongly influenced by the individual axial symmetric region. The highest adsorption is observed on the shell side, which was in direct contact with the plasma glow discharge. The adsorption in the porous structure decreases from the shell side to the lumen side. On the lumen surface the adsorption is significantly lower than on the shell side. So it can be concluded that plasma functionalisation takes place not only on the surface in direct contact with the plasma, but activated functional species diffuse into and modify also the inner porous structure. Further investigations indicate that the range and density of modification into the membrane structure can be influenced by the plasma parameters, pressure, power, precursor type and flow rate, but also the transport velocity of the hollow fibre membranes.

What is claimed is:

1. A method for continuous production of a porous hollow fibre membrane having regioselective affinity for compounds in blood or other biologically active fluids to be removed during purification of blood or said fluids, the method comprising:
   providing a porous hollow fibre membrane substrate having a blood side and a filtrate side connected via pores;
   providing a vacuum system comprising:
      a first vacuum sealed chamber having a pressure of at most 300 mbar,
      a vacuum sealed plasma ignition chamber having a pressure of at most 0.05 mbar before introduction of a precursor gas and a plasma ignition step,
      a last vacuum sealed chamber having a pressure of at most 300 mbar, and
      optionally additional vacuum sealed chambers located between any of said first vacuum sealed chamber, vacuum sealed plasma ignition chamber, and last vacuum sealed chamber, wherein all of said chambers are consecutively interconnected in series;
   feeding said porous hollow fibre membrane substrate through the vaccum system;
   introducing a precursor gas containing functional groups to the sealed plasma ignition chamber to a pressure of at most 10 mbar when said porous hollow fibre membrane substrate reaches the vacuum sealed plasma ignition chamber,
   displacing any residual air present in the sealed plasma ignition chamber,
   subjecting the porous hollow fibre membrane substrate to a plasma ignition, wherein said functional groups in the precursor gas are homogeneously bound to the filtrate side surface and pore surface of the porous hollow fibre membrane substrate so as to provide regioselective affinity for compounds in blood or other biologically active fluids.

2. The method according to claim 1, wherein the functional groups comprised in the precursor gas are amino, carboxyl, aldehyde, ester, epoxy, hydroxyl or sulphonic acid groups.

3. The method according to claim 1, wherein the precursor gas is diaminocyclohexane (DACH), diethylenetriamine (DETA) or ammonia.

4. The method according to claim 1, wherein ligands having affinity for the compounds in blood or other biologically active fluids are bound to the functional groups, said ligands being proteins, peptides, amino acids, carboxylic acids, nucleotides, oligonucleotides, antigens or antibodies, and mixtures of two or more thereof.

5. The method according to claim 1, wherein the porous hollow fibre membrane substrate has
   an inner diameter of 70-700 μm;
   a wall thickness of 20-150 μm,
   an outer diameter of 110-1000 μm,
   a pore diameter of 0.05-5.0 μm;
   a porosity of 50-90%;
   and a tortuosity of 1-3.

6. The method according to claim 1, wherein the pressure in the vacuum sealed plasma ignition chamber after the introduction of the precursor gas is 0.05-10 mbar.

7. The method according claim 1, wherein nitrogen is added to a nitrogen addition chamber preceding the first vacuum sealed chamber and to a nitrogen addition chamber following the last vacuum sealed chamber.

8. The method according to claim 1, wherein each vacuum sealed chamber is separated from each other by an annular feed trough having an inner diameter of 0.05-0.8 mm more than the outer diameter of the porous hollow fibre membrane substrate, said inner diameter being 0.2-1.0 mm.

9. The method according to claim 8, wherein the vacuum sealed chambers are separated by feed troughs, and
wherein a nitrogen addition chamber is connected to the first vacuum sealed chamber via a feed trough, and the last vacuum sealed chamber is connected to a nitrogen addition chamber via a feed trough.

10. The method according claim 1, wherein the velocity of the porous hollow fibre membrane substrate through the vacuum sealed plasma ignition chamber is 0.5-100 m/min.

11. The method according to claim 1 wherein
the ignition frequency during the plasma ignition is 1 kHz-13.56 MHz, or multiples of 13.56 MHz, or microwave frequency,
the power is 0.5-50 W,
and the voltage of the electrodes is 50-500 Volts.

12. The method according to claim 1, wherein the porous hollow fibre membrane substrate is made up of a mixture of polyarylethersulfone and polyvinylpyrrolidone and is assembled in modules containing a bundle at least 10 fibres.

13. The method according to claim 1, wherein the vacuum sealed chambers are evacuated by use of pumps and the porous hollow fibre membrane is introduced into the vacuum system.

14. The method according to claim 1, wherein a carrier gas, optionally helium, nitrogen, hydrogen, and argon, or mixtures thereof, is mixed with the precursor gas before or in connection with the addition thereof into the plasma ignition chamber.

* * * * *